United States Patent [19]

Albert

[11] Patent Number: 5,150,266
[45] Date of Patent: Sep. 22, 1992

[54] HARD DISK DRIVE ADAPTATION BASED ON APPROACH TIME MEASUREMENT

[75] Inventor: Glenn D. Albert, Yukon, Okla.

[73] Assignee: Seagate Technology, Inc., Scotts Valley, Calif.

[21] Appl. No.: 516,294

[22] Filed: Apr. 30, 1990

[51] Int. Cl.$^5$ .......................... G11B 5/55; G11B 19/04
[52] U.S. Cl. ............................ 360/78.04; 360/78.07; 360/60
[58] Field of Search ........................ 360/60, 61, 46, 67, 360/68, 78.04–78.14; 369/44.27–44.33

[56] References Cited

U.S. PATENT DOCUMENTS

| | | |
|---|---|---|
| 4,300,174 | 11/1981 | Harman et al. . |
| 4,477,849 | 10/1984 | Berger . |
| 4,602,301 | 7/1986 | Saito et al. . |
| 4,697,127 | 9/1987 | Stich et al. . |
| 4,775,903 | 10/1988 | Knowles . |
| 4,777,545 | 10/1988 | Shoji et al. . |
| 4,803,572 | 2/1989 | Haruna et al. ........................ 360/60 |
| 4,949,201 | 8/1990 | Abed ................. 360/78.07 |

*Primary Examiner*—Aristotelis Psitos
*Assistant Examiner*—Steven R. Garland
*Attorney, Agent, or Firm*—Edward P. Heller, III; Bill D. McCarthy; Louis W. Watson

[57] ABSTRACT

A method for maximizing throughput of a hard disk drive by adaptively seeking to a data track at which data is to be stored and adaptively commencing the reading or writing of data in accordance with the movement of the read/write head in the proximity of the data track. In each seek to a data track, an approach time for movement of the read/write head from the entry into a fine control region about the track to a selected distance from the track is measured and reading or writing is commenced at the end of a delay time selected in relation to the approach time. The tracks on the disk are assigned to a plurality of concentric zones to which profile adjustment bins are assigned to contain an adaptive profile adjustment that is added to terminal portions of a read/write head velocity demand profile in accordance with which seeks to tracks are effected. The contents of the profile adjustment bin assigned to the zone containing a track to which a seek is made is updated at the end seek in relation to the direction of the seek and the approach time measured for the seek.

11 Claims, 8 Drawing Sheets

HARD DISK DRIVE ADAPTATION BASED ON APPROACH TIME MEASUREMENT

BACKGROUND OF THE INVENTION

1. Field of the Invention

The present invention relates generally to improvements in data storage methods, and, more particularly, but not by way of limitation, to improvements in methods for acquiring data tracks in hard disk drives and initiating transfer of data to or from the tracks. 2. Brief Description of the Prior Art.

Computer peripherals generally include a device for storing data generated by the computer and a device which is increasingly being chosen for this purpose is a hard disk drive. Such a device is comprised of a stack of metal disks that are mounted on a spindle for rotation about their axes and a plurality of transducer heads that are supported by an actuator adjacent the stack so that the heads can be moved radially across the surfaces of the disks. The disks have magnetizable coatings so that concentric data tracks can be defined on their surfaces for storage of data in the form of magnetic transitions between consecutive segments of the tracks. The data is written to the tracks by passing currents, in one direction on one side of the transition and in the opposite direction on the other side of the transition, through a coil in the transducer head. Subsequently, the data can be read by utilizing the same coil to detect time varying magnetic fields that result from the passage of the transitions by the transducer heads.

The tracks on different disks are arranged in cylinders that are coaxial with the spindle and the drive has a servo system that is utilized both to seek to a selected cylinder and thereafter follow the tracks on the cylinder. A seek to a selected destination track is commonly made in accordance with a velocity demand profile that is stored in a microcomputer and the servo system includes a circuit that passes an electrical current through a coil, immersed in a magnetic field, on the actuator in relation to the difference in the actual radial velocities of the transducer heads across the disks and demand velocities called for by the velocity demand profile. The demand velocities at large distances from the destination track are large, to give rise to a large initial acceleration of the heads toward the destination track and decrease to zero, to decelerate the heads, as the destination track is approached.

The major advantage of the hard disk drive is that it is capable of storing a large amount of data and it is this storage capacity that has brought the hard disk drive into widespread use. Such storage capacity is achieved by a correspondingly high density of tracks on the disk; for example, a disk will typically contain about 1600 tracks per inch. However, such track densities exact a price. Unless the heads are closely aligned with tracks during the reading of data, excessive read errors may occur and, worse, during writing, data may be written to an adjacent track to destroy previously stored data. While the latter can be, and is, prevented by defining "off track" thresholds about the tracks beyond which writing will not take place, the cure can give rise to so-called write faults; that is, stoppages after writing has commenced, should the heads subsequently become displaced from track a distance sufficient to reach the "off track" threshold. Thus, while data on adjacent tracks is not destroyed, a second important consideration in the storage and retrieval of data, throughput; that is, the average rate at which data can be stored and retrieved by a computer using the hard disk drive, is adversely affected.

As will be clear to those skilled in the art, the result of a write fault will be that the disks must be rotated through a full revolution before the location to which the data is to be written again comes into alignment with the head that is to do the writing. Typically, the time for a complete revolution of the disks is about 16 milliseconds, a time that is very long by computer standards. Thus, a write fault can greatly increase the time required to store a particular document that has been generated by a computer and, consequently, reduce the throughput of the hard disk drive. Accordingly, write faults have been avoided in the prior art in a manner that will now be described.

As a read/write head approaches a track, it will cross an "on track" threshold at a selected distance from the track and an indication of the passage of the "on track" threshold is transmitted to the microcomputer that controls the operation of the hard disk drive and, in particular, determines when writing is to commence after passage of the head by the "on track" threshold. If, at the time of the passage, the velocity of the head is excessive, the head may overshoot the track by an amount that will cause it to pass the "off track" threshold on the other side of the track. At the other extreme, the velocity of the head may be so low that the head will stall prior to reaching the track or, for that matter, prior to reaching the "on track" threshold defined for the track. In the latter case, the microprocessor is programmed to make a transition from track seeking to a track following mode of operation, in which fine control circuitry is utilized to maintain the alignment of the head with the track, at a preselected time after the head enters a selected fine control region defined about the track so that the fine control circuitry can pull the head to the track. However, if the head is greatly displaced from the track when the transition to track following occurs, the fine control circuitry may exert large forces on the head that will again result in an overshoot of the track by an amount that will carry it beyond the "off track" threshold. Thus, in either case, the head may cross the "off track" threshold after crossing the "on track" threshold so that the initiation of writing must be delayed, if a write fault is to be avoided, until the head has settled upon the track sufficiently for all danger of subsequent crossing of an "off track" threshold to have passed. In the prior art, this danger is avoided by selecting a delay time, following passage of the "on track" threshold, that must elapse before writing commences and such delay time is selected, for all seeks, that will prevent a write fault for the worst case of either overshoot or stall.

The problem with using a "worst case" delay time before initiating reading or writing is that the throughput is unnecessarily diminished. Most seeks will result in stable track following considerably before the "worst case" delay time has elapsed so that use of such delay time can have a serious adverse affect on the time that elapses between the start of movement of the head toward a destination track and the time that reading or writing is commenced. As a result, until the present invention, lower than desired throughputs have generally had to be accepted. If a short delay time is selected, write faults will occur to lower throughput; longer delay times directly affect the throughput by unnecessarily prolonging the time for commencement of reading and writing until long after stable track following has been achieved.

SUMMARY OF THE INVENTION

In one aspect of the present invention, throughput is increased by adaptively varying the delay time between passage of the "on track" threshold and commencement of reading and writing to select, for each seek, a minimum delay time, consistent with the velocity with which the head approaches the destination track, that will not result in a write fault. In a second aspect of the invention, terminal portions of the velocity demand profile are adjusted adaptively to cause the read/write heads to enter the fine control regions about the tracks with velocities that will cause rapid settlement of the heads on a selected destination track.

To the first of these ends, an approach time is measured for each seek made to any track on a disk, such time being the time from entry of the transducer head into a fine control region about the track to crossing of the "on track" threshold on the side of the track from which the entry is made. The amount of maximum overshoot that will occur after such entry, whether occurring immediately following entry or after a stall, is then determined in relation to the approach time along with the times that the head will reach a distance from the track that represents the maximum excursion of the head from the track during steady state track following. The delay time is then selected to be the time that the maximum excursion distance is first reached for cases in which the maximum overshoot will not cause a write fault. In these cases, since no write fault can occur, the read/write head is essentially undergoing stable track following when such excursion distance is reached. For cases in which the maximum overshoot will reach the "off track" threshold, the delay time is selected to be the time that the head will return to the maximum excursion distance for steady state track following after the overshoot has occurred. Since displacements of the read/write head from the track during settling steadily decrease in amplitude, the latter selection is essentially the time that stable track following commences following a large overshoot. Thus, the minimum delay time that will avoid a write fault is selected for every seek that is made to any track on any disk.

The second aspect of the invention exploits a generally inverse relation between the approach time and the speed with which the head enters the fine control region about the destination track. To this end, the statistical distribution of the approach time for selected adjustments to terminal portions of the velocity demand profile is measured and utilized to determine approach times that indicate speeds of entry of the head into the fine control region about the destination track that are so large as to cause excessive overshoot or so small as to cause stalling of the read/write head prior to reaching the destination track. The disks are then divided into zones and, each time a seek is made to a track in a zone, the approach time is measured and compared to the times that indicate excessive or insufficient speed of the read/write head as it enters the fine control region about the track to which the seek has been made. Velocity demand profile adjustments which have been stored in the microcomputer as the result of previous seeks to the same zone are then updated for addition to the velocity demand profile during terminal portions of the next seek to a track in the zone. Thus, after a number of seeks have been made to tracks in a zone, the speed of entry of the read/write head into the fine control region about a selected destination track in the zone will be such to cause a rapid settling of the head onto the track. Thus, throughput is increased by preventing stalling on the one hand and by limiting overshoot on the other hand. Thus, for the overwhelming majority of seeks, writing can be commenced as soon as the read/write head reaches a distance from the destination track that corresponds to the maximum excursion of the head from the track during track following.

An object of the present invention is to increase the throughput of a hard disk data storage device.

Another object of the invention is to limit the time for initiating a data transfer to or from a track on a data storage disk following movement of a read/write head to that track.

Yet another object of the invention is to optimize seeks to a track on a data storage disk to limit the time required for a read/write head to settle on the track.

Other objects, features and advantages of the present invention will become apparent from the following detailed description when read in conjunction with the drawings and appended claims.

DESCRIPTION OF THE SERVO SYSTEM

Figure 1:
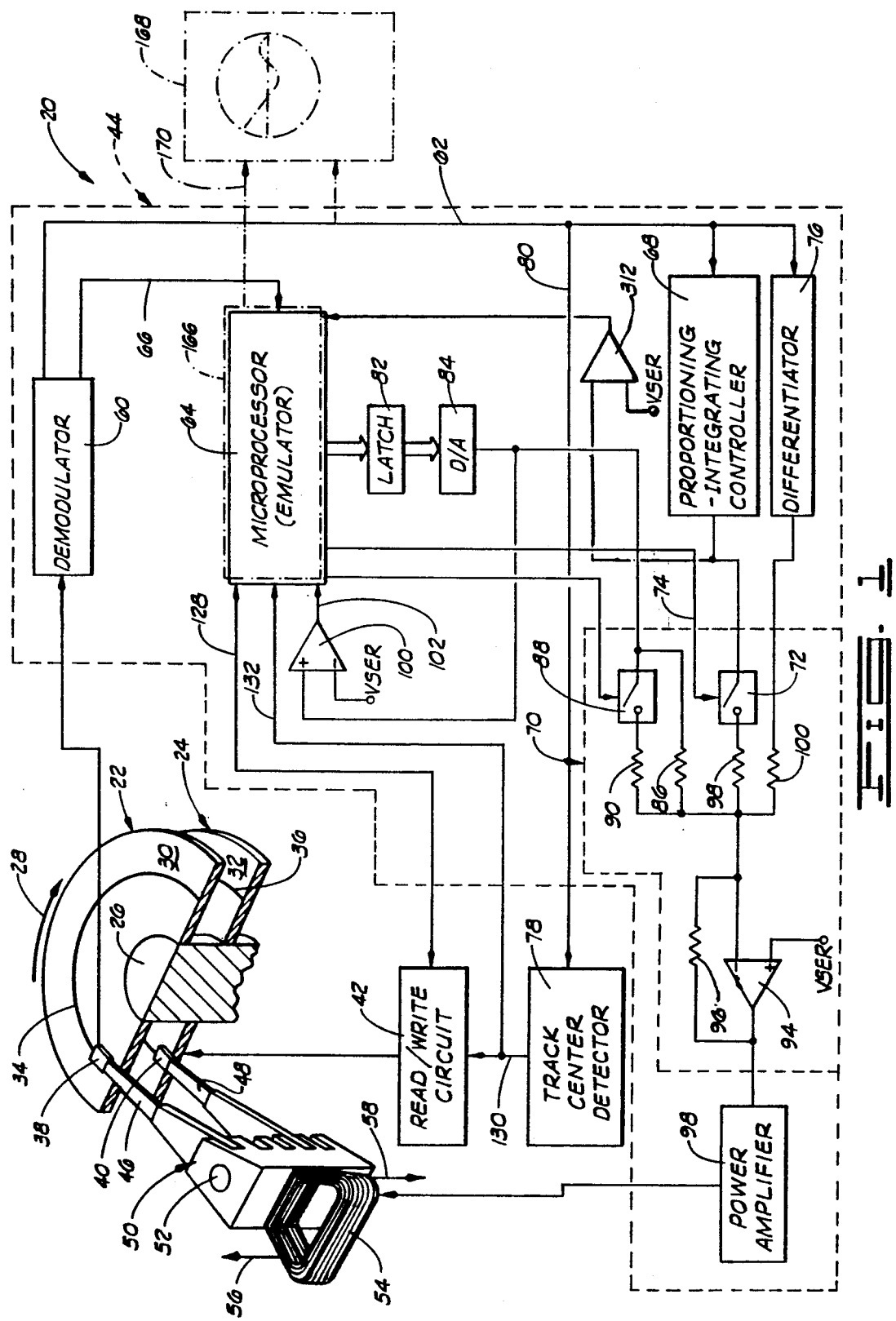
FIG. 1 is a schematic diagram of a rotating disk data storage device in which the method of the present invention can be practiced.

In order to provide a basis for describing the method of the present invention, FIG. 1 has been included to schematically illustrate a rotating disk data storage device 20 wherein the method is employed. For concreteness of description, it will be assumed that the device 20 is of the type which utilizes a dedicated servo surface to effect seeking and track following by magnetic heads of which the device 20 is comprised but no limitation of the inventive method to use in such devices should be inferred from such assumption. Rather, it is contemplated that the inventive method can equally well be used in devices of the embedded servo type wherein servo information is interspersed data that is stored in the device.

With this understanding, the device 20 is comprised of a plurality of disks, two of which have been shown in FIG. 1 and designated by the numerals 22 and 24 therein, that are coaxially mounted on a spindle 26 for rotation in a direction indicated at 28. As is known in the art, the disk surfaces, such as the surface 30 of the disk 22 and the surface 32 of the disk 24, are provided with magnetized coatings so that information can be written along circular tracks, such as the track 34 on the surface 30 and the track 36 on the surface 32, by magnetizing consecutive segments along the tracks in opposite directions using conventional magnetic heads 38 and 40 that receive electrical currents from a conventional read/write circuit 42. Thus, by varying the directions of these currents as the disks 22 and 24 rotate, consecutive segments of the tracks are magnetized in opposite directions to record the information that is contained in the series of current reversals through the heads 38 and 40. Subsequently, the information is read by detecting the magnetic reversals occurring along a selected track.

For purposes of illustration, the circuit 20 has been drawn for the case in which the surface 30 of the disk 22 is a dedicated servo surface containing only servo information, written at the time the device 20 is manufactured, that is used by a servo circuit, indicated in dashed lines at 44 in FIG. 1, to move the head 38 from one track to another, in a seek mode of operation of the servo circuit 44, and to maintain the head 38 in radial alignment with a selected track, in a track following mode of operation of the servo circuit 44, once such a move has been accomplished. In such case, data is stored on tracks of the disk 24 and other disks of the device 20 which have not been shown. The tracks on the disks are organized into concentric, circular cylinders, each comprised of a track on each surface of each disk, so that alignment of the head 40 with a track on the surface 32 is maintained by a common support of the heads 38 and 40 to be discussed below. Accordingly, movement of the head 40 to a selected data track on a selected cylinder is accomplished by moving the head 38 to a track on the same cylinder on surface 30.

The servo information on the disk 22 has the form of a regular pattern, not shown, that is repeated both radially and circumferentially on the surface 30 to cause generation in the head 38 of servo signals that depend on both the radial and circumferential location of such head with respect to the tracks on the surface 30 as the disk 22 rotates. A suitable pattern and the manner in which the pattern is used to generate servo signals has been described in U.S. Pat. No. 4,811,135 issued Mar. 7, 1989 to Donald W. Janz, the teachings of which are incorporated herein by reference.

The heads 38 and 40 are supported adjacent the surfaces 30 and 32 by arms, 46 and 48 respectively, of an actuator 50 that is mounted on a spindle 52 so that pivotation of the actuator will cause radial movement of the heads across the disks. Such pivotation is effected by passing an electrical current through a coil 54 mounted on the end of the actuator 50 opposite the end whereon the heads 38 and 40 are mounted. Permanent magnets (not shown) are positioned about the coil 54 to immerse opposite sides of the coil 54 in oppositely directed magnetic fields, indicated by the arrows 56 and 58, so that passage of a current through the coil 54 in one direction will move the heads radially outwardly while passage of a current through the coil 54 in the opposite direction will move the heads radially inwardly.

Signals generated in the head 38 are transmitted to a demodulator 60 which generates position error and track crossing signals used to position the heads 38 and 40 and, as described in the aforementioned U.S. Pat. No. 4,811,135, servo pattern shown therein defines a fine control region about each track on the surface 30 extending from the midpoints between such track and each of the tracks adjacent thereto. (Because of the alignment of the heads 38 and 40, a similar fine control region is defined for the head 40.) In such region, for each track, the demodulator 60 responds to signals received from the head 38 by providing a position error signal, on a conducting path 62, that has an amplitude, measured from a servo ground VSER which is held a selected voltage level above a circuit ground established by the device 20 power supply (not shown), that is proportional to the offset of the center of the head 38 from the center of the track associated with the region. (The servo ground can conveniently be provided by a voltage regulator, not shown, connected across the power supply.) Additionally, the demodulator 60 senses the timing of pulses generated in the head 38 by passage of edges of the servo pattern on the disk surface 30 under the head 38 and provides the downgoing edge of a square pulse each time the head 38 passes from a fine control region about one track to the fine control region about an adjacent track. (The geometry of the pattern that will result in the appropriate timing has been shown in the aforementioned U.S. Pat. No. 4,811,135.) These pulses, referred to herein as track crossing signals, are provided to a clock terminal of a counter (not shown) included in a microprocessor 64 of which the device 20 is comprised on a conducting path 66. (As is known in the art, microprocessors suitable for use in data storage devices have a plurality of counters which can be used for a variety of tasks determined by the programming of the microprocessor.) Thus, during a seek operation, the number of tracks remaining to completion of the seek may be continuously maintained in the microprocessor 64 by entering the two's complement of the number of tracks the head is to be moved in the seek into a counter of the microprocessor and subsequently clocking such counter with the track crossing signals. The direction of movement is determined in a manner that will become clear below.

The position error signal is transmitted to a proportioning-integrating controller 68 whose output provides one component, proportional to both the position error signal and the integral thereof, of a correction signal to a summing amplifier, indicated in dashed lines at 70, during operation of the servo circuit 44 in the track following mode. An electronic switch 72, via which the amplifier receives such component of the correction signal, is closed during such operation, and, for a reason to become clear below, opened during a seek operation from one track to another. The switch 72 is controlled by signals received from the microprocessor 64 on conducting path 74 for this purpose.

The position error signal from the demodulator 60 is also transmitted to a differentiator 76 which continuously provides a correction signal corresponding to the actual radial velocity of the head 38 across the surface 30 to the summing amplifier 70 to modify the basic proportioning control scheme of operation of the servo circuit 44 during track following and, further, to effect seeks from one track to another in a manner to be described below. Additionally, the position error signal is provided to a conventional track center detector 78, via conducting path 80, for a purpose to be discussed below.

In addition to the signals received from the controller 68 and differentiator 76, the summing amplifier 70 receives a velocity demand signal utilized in effecting seeks from the microprocessor 66 via a latch 82 and a D/A converter 84. The velocity demand signal is received at a resistor 86 and, additionally, at an electronic switch 88 and series resistor 90, in parallel with the resistor 86, so that the gain of the summing amplifier 70, with respect to the velocity demand signal, can be varied by signals provided by the microprocessor 64 to open the switch 88 for low gain and close the switch 88 for high gain.

The summing amplifier 70 is comprised of an operational amplifier 94 having a feedback resistor 96 connected between the output of the operational amplifier 94 and the inverting input thereof to fix, in combination with the resistors 86 and 90, and resistors 98 and 100 connected to the outputs of the controller 68 and differentiator 76, the gains of the signals received by the amplifier 70. The noninverting input of the operational amplifier 92 is connected to the aforementioned servo ground so that correction signals supplied by the proportioning and integrating controller 68 will provide a measure of the displacement, and the integral of the displacement, of the heads 38 and 40 from tracks on the disks 22 and 24 that are being followed in the track following mode of operation of the device 20.

The output of the summing amplifier 70 is provided to the input of a transconductance power amplifier 98 which drives a current through the coil 54 of the actuator 50 in proportion to the output signal received from the summing amplifier 70.

Finally, the circuit 20 is comprised of a comparator 100 that receives the servo ground and the signal from the D/A converter 84 to permit measurement of the servo ground as part of the start up routine of the data storage device 20. To this end, the microprocessor is programmed to output a succession of digitally expressed numbers, during start up, that correspond to different velocities to be demanded of the head 38 during a seek while monitoring the output of the comparator 100 on a conducting path 102. The D/A converter 84 converts these numbers, referred to hereinafter as D/A values, to electrical signals having voltages proportional to the number in the latch 82 with respect to the system ground so that the servo ground is determined as the value in the latch 84 that will cause a change in the output state of the comparator 100.

The voltage level of the servo ground is selected so that a digitally expressed number substantially at the midpoint of the range expressible in the latch 82 will, in view of the connection of the noninverting input of the operational amplifier 94 of the summing amplifier 70 to the servo ground, represent a zero demand velocity for the head 38 across the surface 30. Higher numbers in the latch 82 will result in a velocity demand signal to the amplifier 70 tending to drive the head 38 in one direction across the surface 30 and lower numbers will result in a velocity demand signal tending to drive the head in the opposite direction across the surface 30.

Prior Art Velocity Demand Profile

In carrying out the general goal of minimizing the time required to acquire a track to which data is to be written or from which data is to be read and subsequently initiating the read or write operation, the present invention continuously adapts a prior art velocity demand profile by means of which a movement to a selected track is made. To provide a basis for an understanding this aspect of the invention, FIG. 2, which illustrates the prior art velocity demand profile 104, has been included for a discussion of the manner in which seeks between cylinders of tracks on the disks of the device 20 is carried out. For purposes of discussion, such cylinder will be considered to include a destination track that is to be acquired by the head 40.

Figure 2:
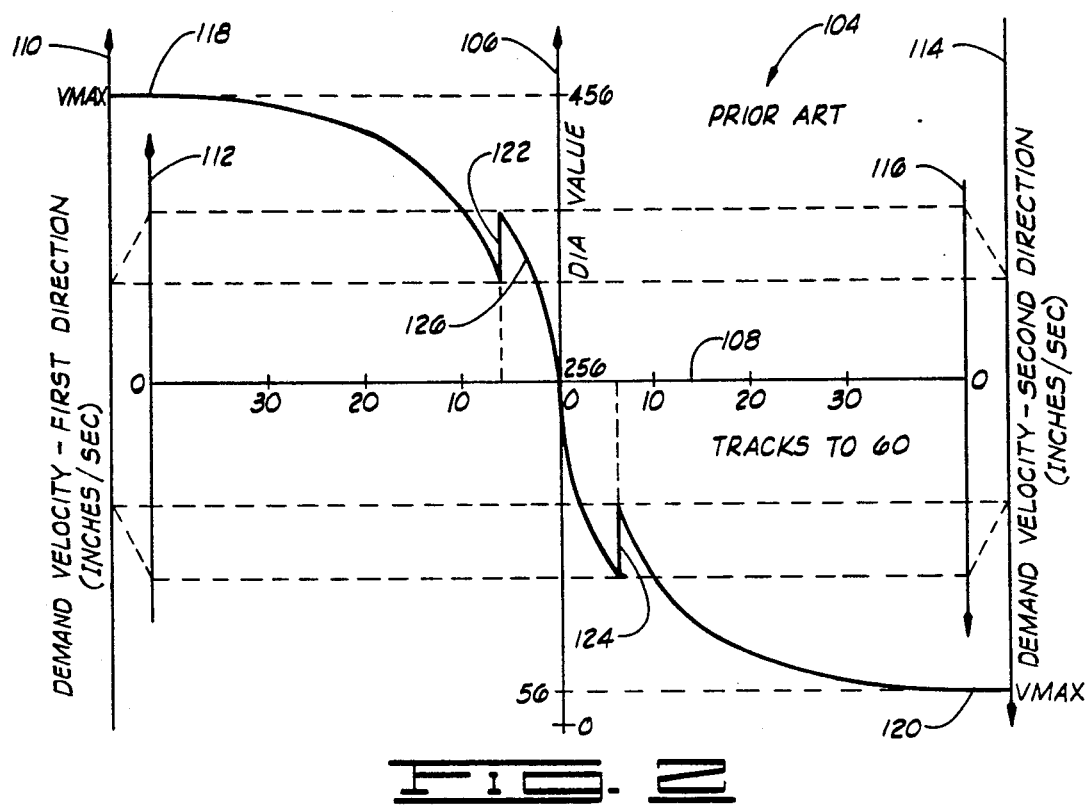
FIG. 2 is a prior art velocity demand profile used in effecting seeks to a destination track.

For use in accomplishing seeks from one cylinder of tracks to another, the velocity demand profile 104 is stored in a look up table in the microprocessor 64 as a series of D/A values that are periodically entered into the latch 82 as the heads 38 and 40 are moved toward the destination cylinder represented by the central vertical axis 106 of FIG. 2. These values are converted to an analog signal by the D/A converter 84 and transmitted to the summing amplifier 70 as noted above. As also noted above, a D/A value larger than the servo ground will cause the summing amplifier to provide a signal to the power amplifier that tends to cause the head to be moved in one direction while a D/A value smaller than the servo ground tends to cause the head to move in the opposite direction so that, by outputting the profile velocities on a tracks to go basis measured from the destination track and plotted on the axis 108 of FIG. 2, the microprocessor 64 can be caused to drive the heads 40 to the destination track.

For purposes of illustration, it will be assumed herein that movement of the head 40 in a first direction toward the outer edge of the disk 24 is occasioned by increasing the D/A value outputted to the latch 82 while decreased D/A values result in movement of the head 40 in a second direction away from the outer edge of the disk.

In order to use such D/A values, the values are correlated with the velocities the head 40 is to have in physical units, such as inches per second, and additional vertical axes 110 and 112, indicating demand velocities in physical units for movement in the first direction, and axes 114 and 116, indicating demand velocities in physical units for movement in the second direction, have been included in FIG. 2 to provide a basis for a discussion of the correlation.

Initially, it is noted that the velocity demand profile, in physical velocity units versus number of tracks to go in making a seek to any selected destination track, can be obtained for purposes of the present invention in any conventional manner so that only a qualitative discussion of the manner in which the profile is generated is needed for the present disclosure. In general, the velocity demand profile is obtained by modeling the mechanical and electrical properties of the rotating disk data storage device and selecting velocities for the profile that will cause the head to have an initial high acceleration toward a selected destination track followed by a period, for long seeks, in which the head has a selected constant maximum speed that is indicated by flat portions 118 and 120 of the profile 104. For example, such maximum speed might be 50 inches per second as has been indicated in FIG. 2. As the head 40 nears the destination track, demand velocities are steadily decreased to cause a controlled deceleration of the head 40 that will cause it to enter the fine control region about the destination track with a speed that will facilitate rapid settling of the head 40 onto the destination track after a transition to the track following mode of operation of the servo circuit 44. Seeks are then effected via the comparison of the demand velocity that is periodically updated at the latch 82 and the actual velocity of the heads 38, 40 that is generated by the differentiator 76. (The switch 72 is opened during seeks so that the current through the coil 54 is proportional solely to the difference in actual and demand velocities of the heads 38, 40. Following the transition to the track following mode of operation occurring, at a time to be discussed below, after entry of the head 40 into the fine control region about the destination track, he switch 72 is closed and the D/A value in the latch 82 is set to a zero demand velocity or, preferably, to a position feed forward value as described in U.S. Ser. No. 366,753 entitled Method and Apparatus for Minimizing Settle Time in Servo Systems for Following Magnetically Recorded Tracks in Rotating Disk Data Storage Device filed June 14, 1989 by Robert D. Murphy and Stephen R. Genheimer and now abandoned.)

In order to correlate demand velocities in physical units to demand velocities in D/A values, D/A values are selected for the maximum speed to be demanded of the head across the disk in both directions; for example, if the latch 82 is a nine bit latch and the servo ground corresponds to a D/A value 256, the D/A value for maximum speed for the heads 38, 40 in the first direction can conveniently be chosen to be 456 and the D/A value for maximum speed movement in the second direction would then be chosen as 56. The microprocessor is programmed to transmit each of these two D/A values to the latch 82 as part of the start up routine for the circuit 20 and measure the actual velocity that each D/A value will produce by counting track crossing signals received by the microprocessor 64 for a selected time interval. Thereafter, seeks can made by outputting D/A values to the latch 82 and D/A converter 84 in accordance with the stored velocity demand profile that has been illustrated in FIG. 2 while the switch 72 is held open by the microprocessor 64.

Before proceeding, it will be useful to note the characteristics of the stored velocity demand profile established in this manner. Initially, the profile is symmetric with respect to both direction of movement of the heads 38, 40 and D/A values measured from the servo ground level as indicated by the horizontal axis 114. Because of this symmetry, a microprocessor 64 using the profile 104 will call for the demand velocities without regard to forces that might be exerted on the actuator 50 in addition to the Lorentz force on the coil 54 produced by passing therethrough a current from the amplifier 98. Further, such symmetry assumes that no offsets exist in the electronics in which the servo circuit 44 is implemented. Because of these assumptions, the actual velocity of the head 40 as it enters the fine control region about the destination track may not be such to result in rapid settling of the head on the track; offsets in the electronics will cause the head to not follow the profile and other forces can render the profile unsuitable for causing rapid settling of the head 40 on the destination track. Other effects, such as inhomogeneities in the magnets used to provide the fields in which the actuator coil is immersed and even temperature variations that might effect the characteristics of the electronics can similarly result in the profile being, first, inappropriate for the track to which the seek is made and, secondly, not being followed. The result is that the head 40 might overshoot or undershoot the destination track so that a delay must be introduced in the reading or writing to such track to permit the heads to settle on the track. In the past, the delay has been selected on a worst case basis that will prevent the possibility of a write fault; that is, an interruption of writing after a transfer of data has commenced caused by a movement of the head 40 to off track position that might result in overwriting of an adjacent track, from occurring for any track on the disk 24. In one aspect of the invention, the profile is continuously adapted to cause rapid settling of the head 40 on the destination track at the end of a seek and, in another aspect of the invention, the delay time before reading and writing by the read/write circuit 42 is commenced is also adaptively selected to provide the minimum delay time that will ensure against a write fault for any seek to any destination track on the surface 32.

A second feature of the velocity demand profile is the presence of discontinuities 122 and 124 about a central portion 126 of the profile near the destination track. (For clarity of illustration, the velocity demand profile 104, has not been drawn to scale. Thus, for example, the velocity of the head 40 at the discontinuities 122 and 124 is typically about ten percent of the maximum velocity during a seek.) In the preferred mode of performing a seek, it is desired that the gain of the summing amplifier 70 with respect to the demand velocity be high for large separations of head 40 and the destination track to give rise to a large initial acceleration of the head that will cause it to rapidly reach the maximum speed the head is to have during a seek. On the other hand, resolution of demand velocities is important near the destination track to finely control the speed with which the head enters the fine control region about such track. Both of these considerations are met by changing the gain of the amplifier 72, with respect to the demand velocity received from the microprocessor 64, as the head 40 approaches the destination track. High gain, in initial portions of the seek, is effected by closing the switch 88 during initial portions of the seek, to place the resistors 86 and 90 in parallel. Since the gain of a summing amplifier, for each signal to be added, is the ratio of the feedback resistance; i.e., the resistance of resistor 96, to the resistance through which such signal is introduced into the noninverting input of the operational amplifier 94, the parallel connection of resistors 86 and 90 increases the gain of the amplifier 70 with respect to the demand velocity. Correspondingly, opening the switch 88 near the destination track reduces the gain of the amplifier 70 with respect to the demand velocity. Such gain transition for the summing amplifier can conveniently be selected to occur at; for example, six tracks to go in the execution of a seek. At the same time, the D/A values, measured from the base value at the axis 108, are multiplied by the reciprocal of the gain change to maintain a constant relationship between D/A value and velocity, in physical units, demanded by the microprocessor during the seek. The axes 110 and 114 indicate demand velocity in the high gain portion of the profile while the axes 112 and 116 indicate demand velocity for the low gain portion of the profile.

Delay Time Selection

Referring once again to FIG. 1, reading and writing of data to a selected destination track is carried out, in a conventional manner that need not be discussed for purposes of the present disclosure, by the read/write circuit 42 under the control of the microprocessor 64. Such control is effected by disabling the read/write circuit 42 until such circuit receives a "command complete" signal from the microprocessor 64 on a conducting path 128 that a seek to the destination track has been completed and a sufficient time following the transition to the track following mode of operation of the servo circuit 44 has elapsed to insure that a write fault will not occur once a data transfer has begun. The read/write circuit then effects the transfer of the data between the destination track and a buffer (not shown) in which the data is received from, and from which it is sent to, a host computer which uses the data storage device 20.

In addition to requiring the "command complete" declaration to commence a data transfer, the read/write circuit 42 further requires a "true" signal from the track center detector 78 on conducting path 130 if the data transfer, in the case of a write operation, is to be continued. To this end, the track center detector 78 is a level detector, with hysteresis, that continually monitors the position error signal generated by the demodulator 60 and undergoes a transition from a "false" output state to the "true" output state each time the difference between the position error signal and the servo ground decreases to a selected value, defining "on track" thresholds on both sides of the destination track, utilized in selecting a data transfer delay in a manner to be described below, and undergoes a transition from a "true" state to a "false" state, each time such difference increases to a second, higher, value that defines "off track" thresholds, again on both sides of the destination track, that are used in determining the amount of delay that is to be imposed before the commencement of a data transfer. The output state of the track center detector 78 is transmitted to the microprocessor 64 on a conducting path 132 and used, as will be described below, to determine the point in time from which the delay prior to a data transfer is commenced.

Figure 3:
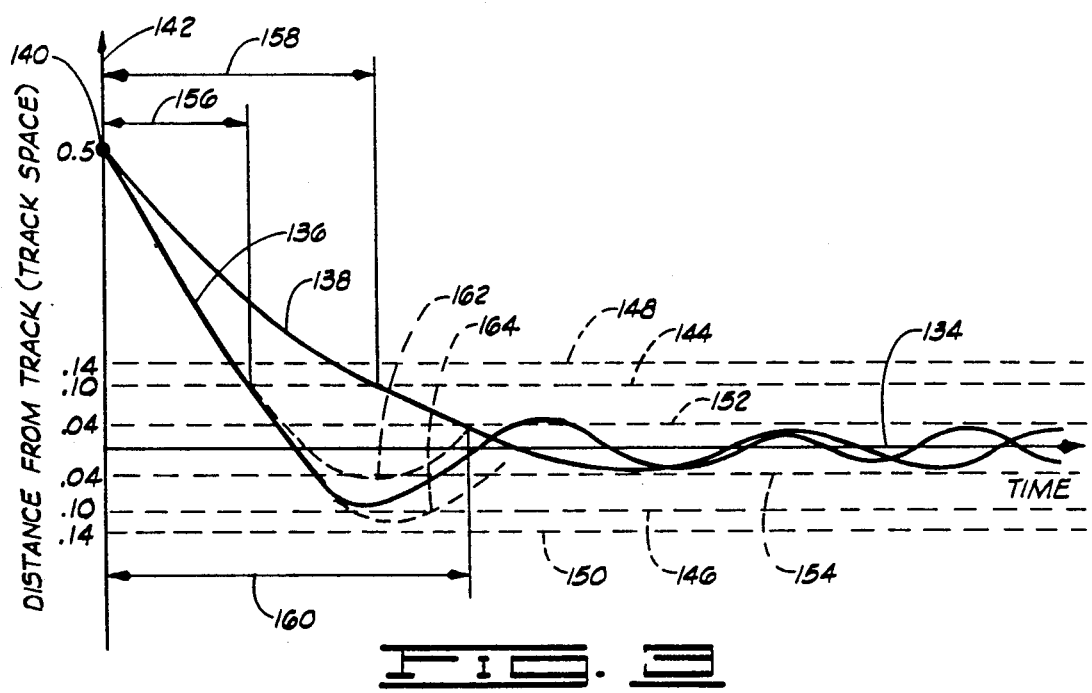
FIG. 3 is a graph illustrating the location of a magnetic head in relation to time for terminal portions of a seek.
Figure 4:
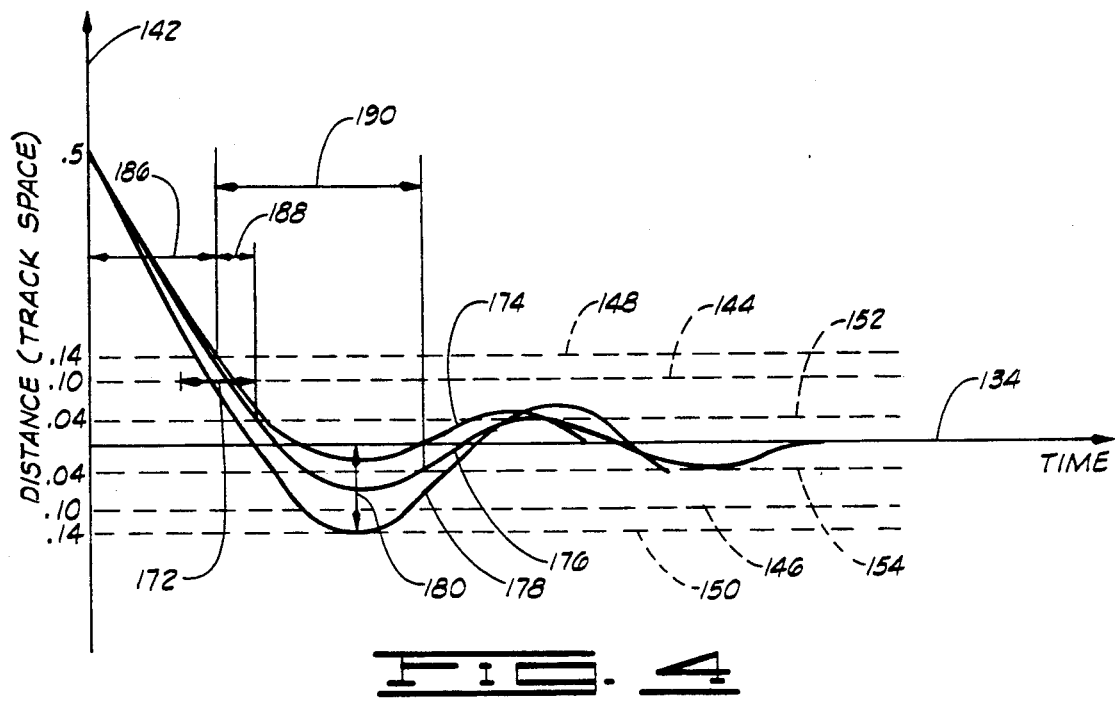
FIG. 4 illustrates an envelope of head position versus time curves for an increment of approach time.
Figure 5:
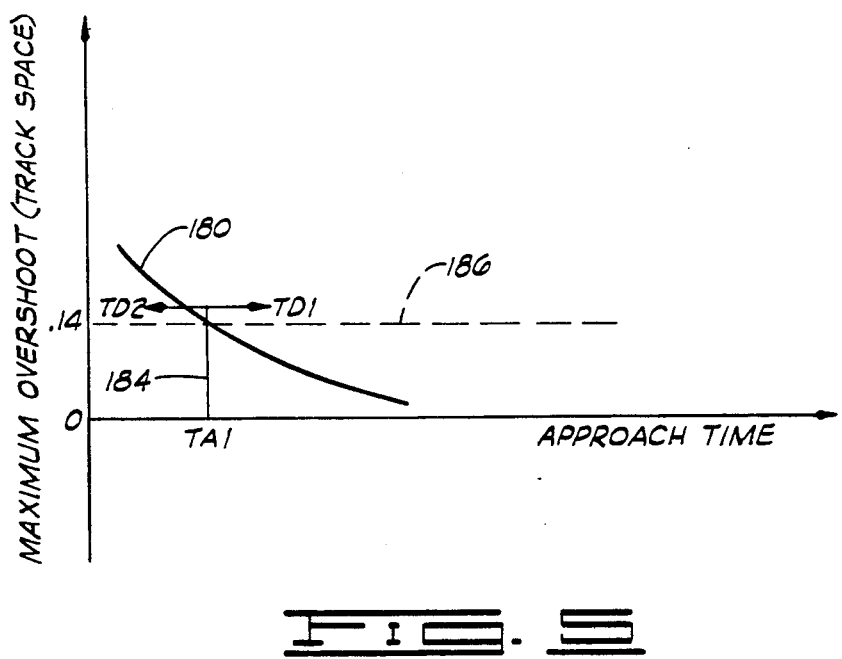
FIG. 5 is a graph of maximum overshoot for head position versus time envelopes in relation to approach time.

FIGS. 3 through 5 illustrate the manner in which a time delay, prior to a data transfer, is selected in the case in which the head 40 overshoots the destination track, indicated by the abscissa 134 in such drawings. Referring first to FIG. 3, shown therein are graphs 136 and 138 of the distance of the head 40 from the destination track 134 in relation to time following entry of the head 40 into the fine control region about the destination track, at a distance of one half track spacing indicated by the point 140, for two seeks for which different amounts of overshoot have occurred. As discussed in the aforementioned U.S. Pat. No. 4,811,135 and in view of the mounting of the heads 38 and 40 on the actuator 50, the distances plotted along the ordinate 142 are substantially directly proportional to the position error signal generated by the demodulator 60 so that the "on track" and "off track" thresholds for which the track center detector 78 undergoes transitions between the "true" and "false" output states thereof correspond to distances that have been indicated by dashed lines at 144 and 146 for the "on track" thresholds and by dashed lines at 148 and 150 for the "off track" thresholds. (As is known in the art, the heads 38 and 40 are not perfectly aligned nor will their misalignment be constant in time. For example, a change in a temperature gradient in the actuator 50 can result in a change in the misalignment between the heads 38 and 40. The thresholds are selected with such variations in mind so that the discussion of the selection of the time delays to be given below will not depend upon misalignment between the head 38 that determines the location of the heads 38 and 4 during track following and the head 40 that is used in reading or writing data. (For long term variations, the misalignment is compensated by shifting the head 38 away from the track on the same cylinder as the destination track in a manner that has been described by Paton in IBM Technical Disclosure Bulletin, Vol. 17, No. 6, November, 1974) Typical values for the thresholds are ten percent of the track spacing for the "on track" threshold and fourteen percent for the "off track" thresholds as has been indicated in FIG. 3. Additional lines 152 and 154, at approximately four percent of the track spacing, indicate the limits of excursion of the head 40 from the track 134 at long times after a transition to the track following mode of operation of the servo circuit 44 has occurred.

With respect to the "on track" threshold first crossed by the head 40; that is, the threshold 144 for seeks in the direction indicated by the curves 136 and 138 in FIG. 3, the present invention defines an approach time for a seek as the time between entry into the fine control region about a destination time and crossing of such "on track" threshold. These have been indicated in FIG. 3 for the seeks indicated by the curves 136 and 138 at 156 and 158 respectively. It will be noted that such approach time will be provided to the microprocessor 64 for each seek by a transition from a "false" to a "true" output state of the track center detector 78. In the case of an overshoot, such transition is utilized by the microprocessor to cause the transition of the servo circuit 44 from the seek mode of operation thereof to the track following mode that occurs with the closure of the switch 72 in the input of the summing amplifier 70 from the controller 68 as described above. Several features of the curves shown in FIG. 3 are involved in the selection of delay times to be selected prior to the issuance of a "command complete" declaration to the read/write circuit 42. As can be seen by comparing the curves 136 and 138, the amount that the head 40 overshoots the destination track 134 is generally inversely proportional to the approach time of the head after entering the fine control region about the track. Thus, the seek illustrated by the curve 136 exhibits the greater overshoot but the smaller approach time. A second feature can be seen with respect to the curve 138. For the seek corresponding to such curve, the amount of overshoot is equal to the steady state limit 154 of excursion of the head 40 from the track 134 after the transition to the track following mode of operation of the servo circuit 44. Thus, for the seek corresponding to the curve 138, stable track following is achieved at substantially the time 160 that the head 40 crosses the excursion limit 152. Such a seek will be referred to herein as an "ideal" seek.

A final feature is illustrated for additional seeks represented by the curves 162 and 164 drawn in dashed lines in FIG. 3. The approach time for these curves is the same as the approach time for curve 136 but the overshoot differs from that for the seek corresponding to the curve 136. That is, the relationship between approach time and overshoot noted above is a general one rather than an exactitude. The present invention provides a statistical method for selecting an appropriate delay time that will now be described with reference to FIGS. 1, 4 and 5.

Turning first to FIG. 1, the determination of an appropriate delay time for a seek is made during manufacture of the device 20 by replacing the microprocessor 64 with an emulator 166 that includes a computer that is programmed for entry of commands that might be stored in the microprocessor 64. Thus, seeks can be initiated by the user and, further, the conditions for such seeks can be controlled by; for example, adjusting the velocity demand profile by means of which a seek is effected. Moreover, the distance of the head 38, and thus of the head 40, during terminal portions of a seek are made observable by connection of the y input of an oscilloscope 168 to the conduction path 62 whereon the position error signal is transmitted from the demodulator 60. The oscilloscope 168 is chosen to be of the type that is capable of storing data received at the y input so that display of such data can be triggered by a trigger signal that is subsequently received on a conducting path 170.

With the emulator and oscilloscope in place, a large number of seeks are made to a selected track on the disk 24 and the computer of the emulator is programmed to detect seeks for which the output of the track center detector 78 undergoes a transition from a "false" state to a "true" state in each of a succession of time intervals such as the time interval 172 in FIG. 4, such figure illustrating the relationship between distance of the head 40 from the destination track 134 and time following entry of the head 40 into the fine control region about such track for a plurality of seeks to the track 134. (It has been found that a suitable number of seeks to the selected track for each time interval 172 is approximately 100 and that a suitable duration for the time intervals is 50 microseconds. For purposes of comparison, a typical time for the head 40 to reach the "off track" threshold on the side of the destination track opposite the side from which the head approaches the track is of the order of 750 microseconds.) For each such seek, a trigger signal is transmitted to the oscilloscope 168 to cause the terminal portions of the seek; that is, the head distance from the track 134 versus time after entry of the head into the fine control region about the track 134, to be displayed. Moreover, if necessary, the velocity demand profile for these seeks will be adjusted, by incrementing or decrementing the D/A values for the central portion 126 thereof to insure that the seeks to the selected track will cause the head 40 to overshoot the track 134 as shown in FIG. 4.

In general, the seeks for each time interval will result in the head 40 following a family of paths, only three of which have been illustrated at 174, 176 and 178 in FIG. 4. In particular, the seeks corresponding to the curves 174 and 178 correspond to minimum and maximum overshoot respectively for the time interval 172 that has been illustrated. (For a reason that will become clear below, FIG. 4 illustrates the case in which the overshoot for the curve 178 equals the off track threshold 150.) The curve 176 illustrates an average overshoot for the plurality of seeks to the selected track. Thus, the maximum overshoot for the time interval 172 can be determined, as indicated at 180, by selecting the overshoot for the maximum overshoot curve 178 as the maximum for the interval 172. The relationship between the maximum overshoot for the time intervals and approach time at the center of the intervals has been illustrated by the curve 180 in FIG. 5. As shown therein, the general inverse relationship between approach time and overshoot noted above will yield a curve that undergoes a steady drop from a large overshoot for short approach times to substantially zero as the approach time becomes large enough that undershooting begins to occur. Moreover, for an approach time TA1 illustrated by the vertical line 184 in FIG. 5, the maximum overshoot for the families of seeks defined by the time intervals will equal the "off track" threshold 150 that has been indicated by the dashed line 186 in FIG. 5. Accordingly, all members of the family of curves 174, 176, 178 for that time interval will have an overshoot that is no greater than the "off track" threshold so that, for such family, reading and writing without danger of a write fault can be commenced when the head 40 reaches the track following excursion limit 152 that has been carried into FIG. 4. Thus, for seeks having an approach time as least as large as TA1 illustrated at 186 in FIG. 4, the "command complete" declaration can be made after the delay time TD1, indicated at 188 in FIG. 4, between crossing of the "on track" threshold 144 by the head for the average seek 176 and crossing of the track following excursion limit 152 on the side of the track 134 from which the head 40 approaches the track 134. Thus, for approach times greater than TA1 but less than an approach time TA2 to be discussed below, the "command complete" declaration can be made after the time delay TD1 following the approach time TA1.

For approach times less than TA1, the present invention exploits the form of the seek curves shown in FIGS. 3 and 4 to include a steady drop in the excursion of the head 40 from the track 134 as the head settles thereon to select, for such approach times, a delay time TD2 indicated at 190 in FIG. 4 for which the average seek curve 176 will result in the head 40 returning to the track following excursion limit 154 on the side of the track 134 opposite that from which the head entered the fine control region about the track 134.

Figure 6:
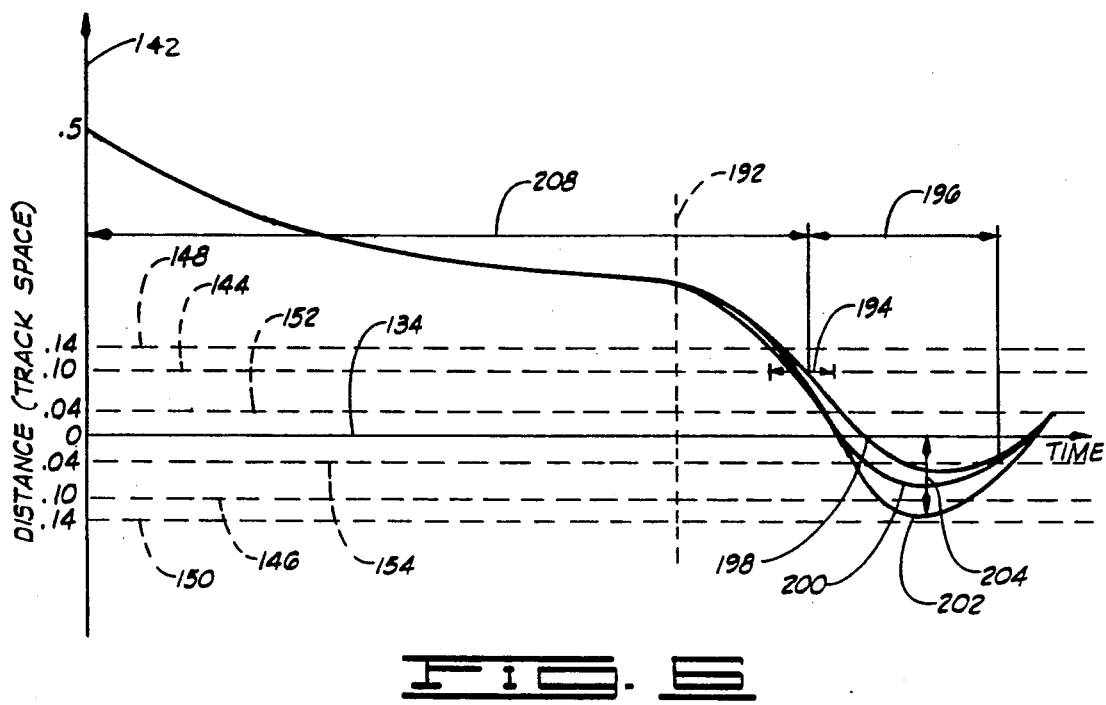
FIG. 6 illustrates a head position versus time envelope for undershoot of a track by a magnetic head.
Figure 7:
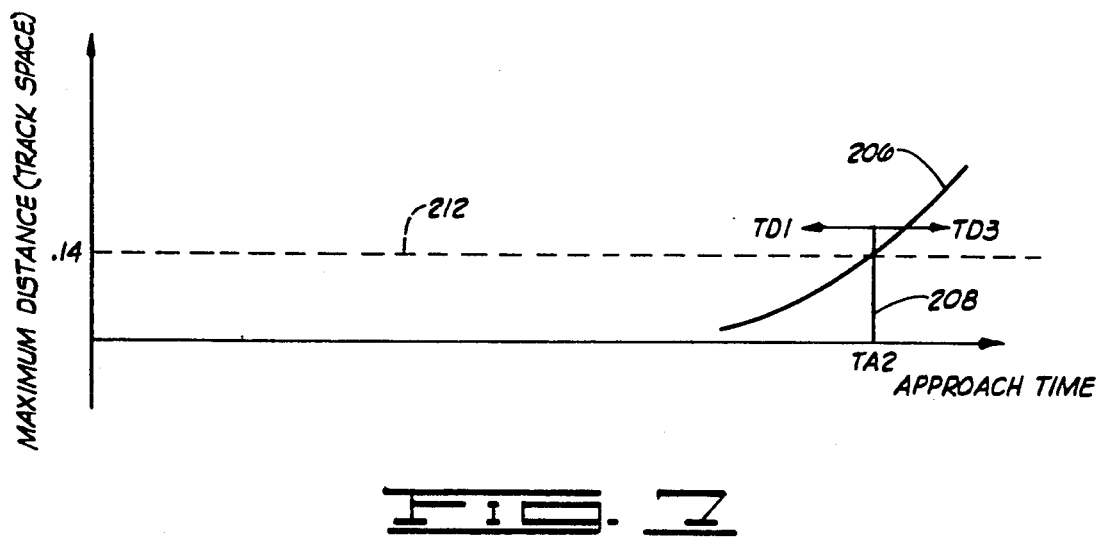
FIG. 7 is a graph of maximum head excursion versus approach time following an undershoot of a track.

FIGS. 6 and 7 illustrate the manner in which the delay time is selected for severe undershooting of the destination track 134. In general, as the approach time increases, the head 40 will begin to stall as it approaches the destination track 134. In severe undershooting, such stalling can occur outside the "on track" threshold 144 on the side of the destination track 134 from which the head 40 approaches the track 134. To insure capture of the head 40 for track following of the destination track 134 in these circumstances, the microprocessor 64 is programmed to cause the servo circuit to undergo the transition from the seek mode of operation to the track following mode no later than a selected time; for example, 500 microseconds, after the head enters the fine control region about the destination track as indicated by the dashed line 192 in FIG. 6. Such Figure is the counterpart of FIG. 4 and illustrates head 40 distance in relation to time for seeks for which the approach time lies within a range indicated at 194 for the severe undershoot case.

For severe undershoot, the head 40 will be displaced a large distance from the destination track 134 when the transition to the track following mode occurs and will have substantially zero speed. Accordingly, the proportioning-integrating controller 68 will provide a large correction signal to the summing amplifier 70 to give rise to a large signal to the power amplifier 98 and a correspondingly large current through the coil 54 to cause a large acceleration of the head 40 toward the destination track. The result is that the head 40 can have a large speed as it crosses the "on track" threshold 144; that is, at the end of the approach time for the seek, so that overshoot occurs in the same manner that overshoot occurs for the case illustrated in FIGS. 3 and 4. This overshoot can result in the head moving beyond the "off track" threshold 150, to give rise to a write fault, if the delay time is selected to be the delay time TD1 at which the head crosses the track following excursion limit 152. Thus, for large approach time corresponding to severe undershoot, a third delay time TD3, indicated at 196 in FIG. 6.

The delay time TD3 is selected in the same manner that the delay times TD1 and TD2 are selected. Specifically, for each of a succession of approach time intervals, such as the interval 194, a large number of seeks are made to the destination track to determine minimum, average, and maximum seek traces that have been indicated, for the interval 194, at 198, 200 and 202 respectively. As was the case for FIG. 4, the interval 194 has been selected for the case in which the maximum overshoot 204 for the family of traces associated with the interval 194 just reaches the "off track" threshold 150 on the side of the destination track 134 opposite that from which the head 134 approaches the track 134.

The curve 206 of FIG. 7 illustrates the relationship between the maximum overshoot for successive intervals of approach time and the average approach time 208 for the average trace 200. As shown therein, such maximum overshoot steadily increases to a distance, indicated by the line 212 in FIG. 7, that is equal to the "off track" threshold 150 at an approach time TA2 indicated at 210. For the same reasons that have been discussed above with respect to FIGS. 4 and 5, the delay time selected for approach times less than TA2, in the undershoot case, is the delay time TD1 and the delay time selected for longer approach times is the delay time TD3, indicated at 194, at which the head 40 returns to the track following excursion limit 154 on the side of the destination track 134 opposite the side thereof from which the head 40 approaches such track.

It has been found that the delay times determined in this manner show little variation with respect to the location of the track used to determine the delay times or with the direction of approach of the head 40 to the destination track. The little variation that does occur can be taken into account by determining the delay times as described for a number of tracks and for both directions of approach and using the means of the approach times TA1, TA2, and TA3 in correlating approach time and delay time. Once the approach times TA1 and TA2, and the corresponding delay times TD1, TD2 and TD3, have been determined, they can be stored in a look-up table in microprocessor 64 to be used in seeks as will be described below. Before proceeding, it should be noted that it will often be preferable for the microprocessor 64 to be programmed to carry out a few final subroutines; for example, making a final check of the track center detector 78 for a "false" condition, just prior to declaring a "command complete" that will enable the read/write circuit 42 to begin a transfer of data. In this case, since the subroutines will be known so that the time required for executing them will similarly be known, the times stored in the look up table can be selected to be the delay times TD1, TD2 and TD3 less the time, referred to herein as TFR, required for these final subroutines to be executed so that, as will be discussed below, the "command complete" will be declared at the end of the appropriate delay time.

Velocity Demand Profile Adaptation

As has been noted above, the present invention also contemplates adjustment of the velocity demand profile by means of which seeks are accomplished and such adaptation is effected by updating adaptive profile adjustments stored in RAM and adding the adjustments to central portions 126 of the velocity demand profile 104 in succeeding seeks as will be discussed below. To form a basis for this discussion, the manner in which updating of an adaptive profile adjustment is effected will be considered.

After the delay times have been determined as described above, the emulator is instructed to adjust the D/A values for the central portion 126 of the velocity demand profile for a seek to the selected track by an amount that will, on average, yield an ideal seek as defined above; that is, a seek that overshoots the destination track by an amount equal to the maximum excursion 154 of the head during steady state track following. Such adjustment is effected by adding a selected D/A value, referred to herein as a velocity feed forward, to all values of the portion 126 of the profile 104, and, with the adjustment, a large number of seeks; for example, approximately 1000, are made in one direction to the selected track and the approach time is measured for each of these seeks by appropriate programming of the emulator. (For purposes of discussion, it will be assumed that these seeks are made in the first direction for which higher D/A values correspond to higher demand velocities and, accordingly, generally lower approach times.)

Figure 8:
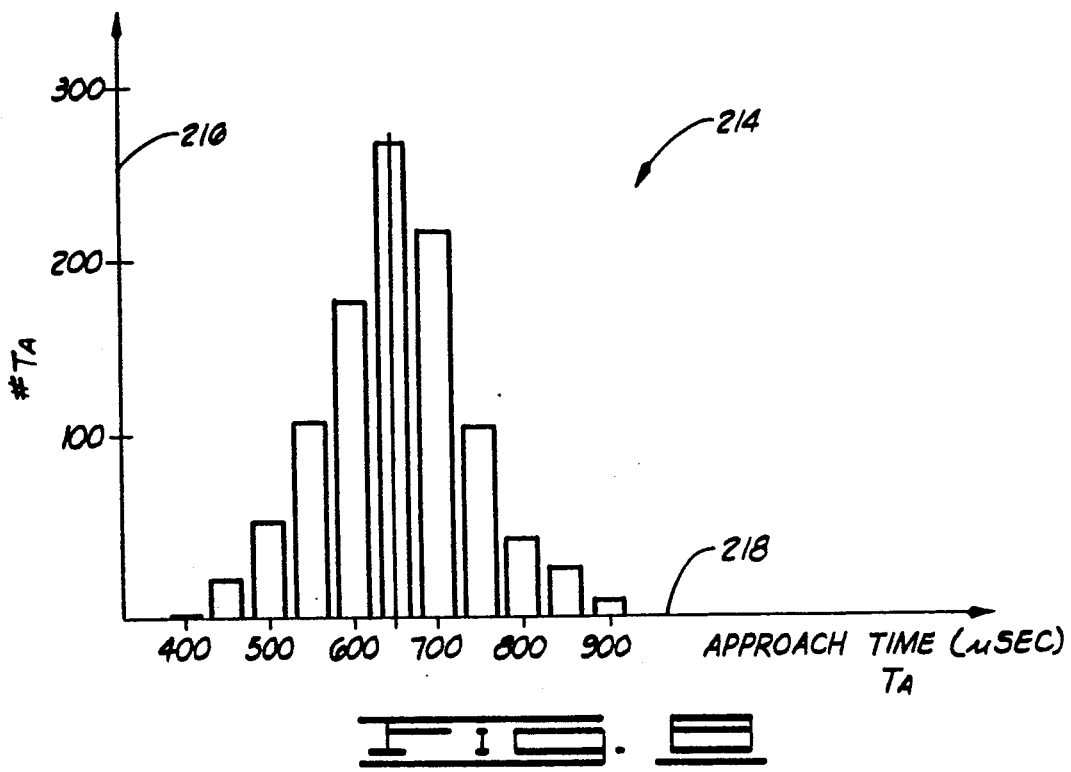
FIG. 8 is a histogram illustrating the distribution of approach time for a seek to a destination track.

In general, the approach time for these seeks will have a distribution that has been illustrated by the histogram 214 of FIG. 8 wherein the number of occurrences of selected ranges of approach time have been plotted on the ordinate 216 against approach time on the abscissa 218. From such a histogram, the average approach time and standard deviation of the distribution are determined for the seek to the selected track in the selected direction with the selected velocity feed forward. The approach time measurements are then repeated, in seeks to the same track in the same direction, with different values of velocity feed forward and, for each value of the velocity feed forward, the average approach time and standard deviation for the approach time distribution are determined. These average approach times and standard deviations are then used, in a manner that has been illustrated in FIG. 9, to determine profile adjustment times that are indicative of excessive and deficient velocities of entry of the head 40 into the fine control region about the selected track so that updating of a stored adaptive profile adjustment for the selected track can be effected by incrementing or decrementing the stored value in accordance with the measured approach time in relation to the profile adjustment times.

Figure 9:
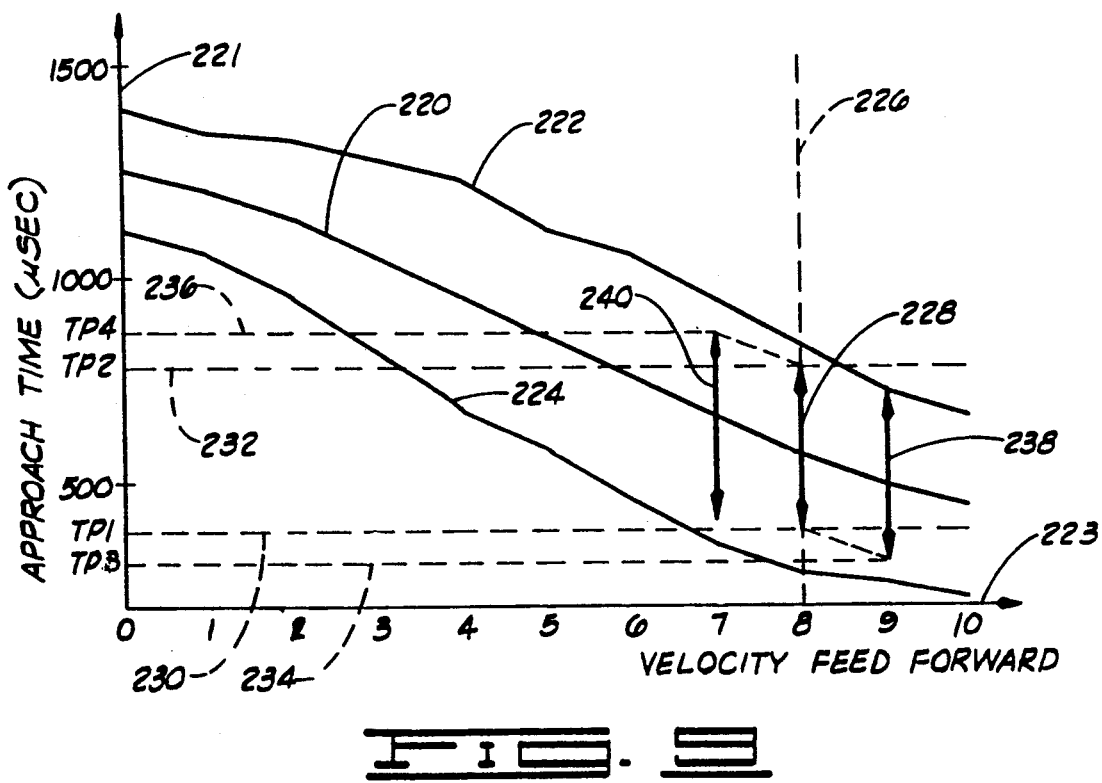
FIG. 9 illustrates the variation of the histogram parameters in relation to adjustments to the velocity demand profile.

Referring to FIG. 9, the curve 220 is a plot, on the ordinate 221, of average approach time for the approach time distributions corresponding to different values of velocity feed forward against velocity feed forward on the abscissa 223. (The velocity feed forward values are plotted in units of D/A value and the assumption, made above, that the seeks are made in the first direction corresponds to the lower values of average approach time for increasing values of velocity feed forward; as noted above, increasing D/A values correspond to increasing speeds and, consequently, lower approach times for seeks in the first direction.) Also plotted in FIG. 9 are the three standard deviation limits, 222 and 224, for the distributions of approach time.

For the velocity feed forward that, on average, will yield an ideal seek, indicated by the line 226 in FIG. 9, a range 228 of approach times, centered on the average approach time, is selected within the three standard deviation limits as a range of approach times that, in view of the distribution shown in FIG. 8, have a high probability of corresponding to seeks that approach the ideal. (A suitable extent for the range 228 has been found to be about 60 percent of the separation of the three standard deviation curves 222 and 224.) The end points of the range 228 are then selected as profile adjustments times TP1, at the lower end of the range, and TP2, at the higher end of the range, as indicated by the dashed lines 230 and 232 respectively. So long as the approach time to the selected track in the selected direction remains in the range 228, seeks made to the track will be nearly ideal and the velocity feed forward that yields such an approach time will provide an adjustment to the central portion 126 of the velocity demand profile 104 that would cause the preponderance of seeks to the selected track to be nearly ideal. Moreover, should a seek to the same track in the same direction result in an approach time less that TP1, indicating an excessive velocity of entry of the head 40 into the fine control region about the track, seeks approaching the ideal can be obtained by selecting a velocity feed forward that would tend to cause the head 40 to enter the fine control region about the selected track with a lower speed. Thus, for movement in the first direction, a lower velocity feed forward than the velocity feed forward that correspond to the line 226 will yield a preponderance of nearly ideal seeks to the selected track. Similarly, a preponderance of nearly ideal seeks can be achieved by adjusting the velocity feed forward value added to central portions 126 of the velocity demand profile 104 to increase the speed with which the head 40 enters the fine control region about the selected track when the approach time is greater than TP2. Thus, for seeks to the selected tracks in the first direction, incrementing the velocity feed forward in response to an approach time greater than TP2 and decrementing the velocity feed forward in response to an approach time less than TP1 will increase the likelihood that succeeding seeks made to the same track will be nearly ideal. (Opposite increments and decrements would have the same effect for seeks in the second direction because of the inverse relation between D/A value and demand velocity in the second direction.)

Profile adjustment times TP3, less than TP1 and indicated by the dashed line 234, and TP4, greater than TP2 and indicated by the dashed line 236, are selected to provide more appropriate adaptive profile adjustments for subsequent seeks by twice incrementing the stored profile adjustment value in a manner that has been indicated by the ranges 238 and 240 in FIG. 9. The range 238 is obtained by shifting the range 228 along the average approach time curve 220 by one increment of velocity feed forward, in units of D/A value, so that decrementing the adaptive profile adjustment for a seek having an approach time less than the lower end of the range 238; that is, less than TP3, will not yield a subsequent seek in the range 228. Rather, the range 238 would merely be shifted back to the range 228 so that the next seek would, on average, have an approach time less than TP1. Accordingly, for seeks in the first direction to the selected track, the adaptive profile adjustment can be updated to yield more nearly ideal seeks by twice decrementing the adjustment in response to an approach time that is less than TP3. Similarly the range 240 is found by shifting the range 228 by one velocity feed forward decrement to similarly determine an approach time, the profile adjustment time TP4, for which a double increment of the adaptive profile adjustment to be added to the portion 126 of the velocity demand profile 104 will, on average, provide a more nearly ideal subsequent seek to the same track in the first direction. (As noted above, decrements and increments should be interchanged for seeks in the second direction.) Thus, the profile adjustment times TP1 through TP4 provide a means of updating an adaptive profile adjustment that, when added to the central portion 126 of the velocity demand profile 104, will cause seeks to the selected track to approach the ideal. It has been found that the profile adjustment times selected in this manner show little variation with track or direction of seek so that the profile adjustment times TP1 through TP4 provide a means for updating an adaptive profile adjustment that can be stored in RAM for any track on the disk 24. The profile adjustment times are determined at the time of manufacture of the hard disk drive and stored in ROM for adaptive adjustment of the velocity demand profile as will be discussed below.

Continuous adaptation of Track Acquisition and Delay of Data Transfer

Figure 10:
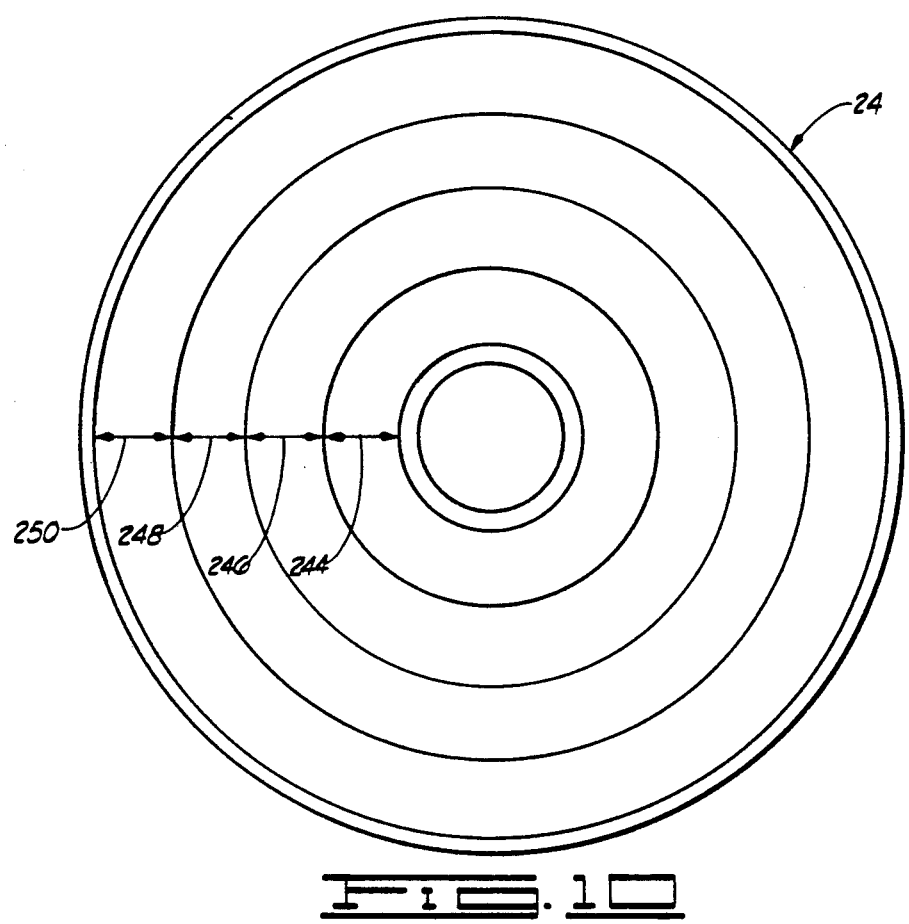
FIG. 10 is a top view of a disk illustrating the definition of zones thereon.

In order to adapt the device 10 to an optimum transfer rate of data to and from the disks thereof, each surface of each disk is divided into a plurality of zones as indicated for the disk 24 in FIG. 10 and each track on each disk is assigned to a selected zone thereon. For purposes of illustration, the disk 24 has been shown divided into four zones 244, 246, 248 and 250 and it is preferred that each zone will contain the same number of tracks. Each zone is then allocated a profile adjustment bin in RAM the microprocessor 64 that will contain a profile adjustment value for each direction of movement of the head across the surface. For purposes of illustration, it will be assumed in the discussion to follow that these profile adjustment values will initially be set to zero. The prior art velocity demand profile 104 will be stored, as described above, in the microprocessor 64 and seeks to a selected destination track will be carried out, as will be described below, in relation to the D/A values of the profile 104 and the profile adjustment values stored in the profile adjustment bin for the zone that includes the destination track. The continuously adaptive aspects of the present invention are then carried out in a manner that will now be described with reference to FIGS. 11 through 13.

In accordance with the assumption that the profile adjustment values stored in the bins established for each zone are initially set to zero, an initial seek to a destination track will be made in accordance with the prior art velocity demand profile 104 that has been copied into FIG. 11 for purposes of discussion. Further, and also for purposes of discussion, it will be assumed that the seek is made in the first direction across the disk 24 by the head 40 and that the microprocessor is programmed to decrease the gain of the summing amplifier when six tracks remain to go in a seek.

Figure 12:
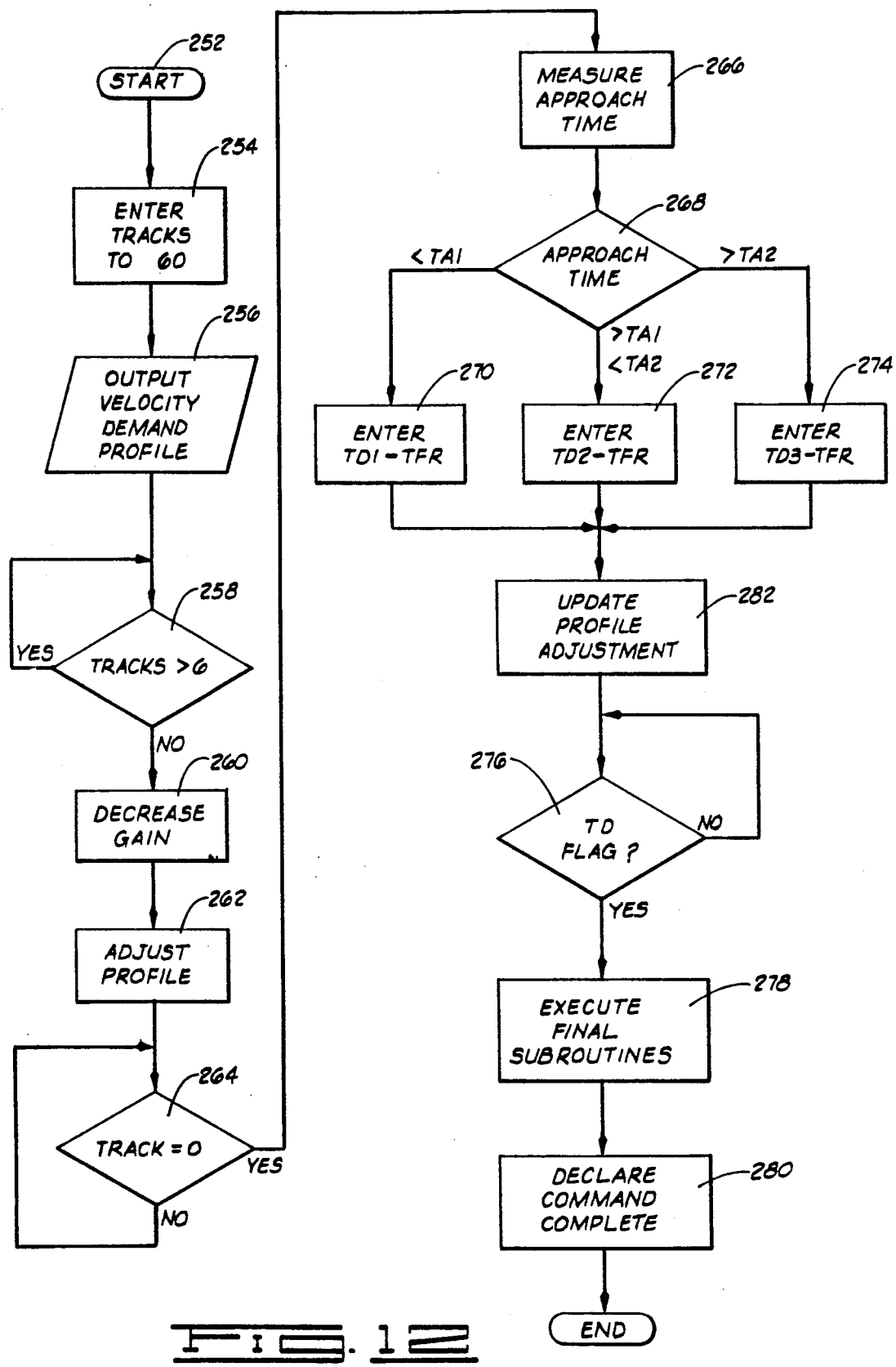
FIG. 12 is a flow chart for a seek in accordance with the present invention.

Referring to FIG. 12, following the start 252 of the program in the microcomputer 64 that carries out the seek, the two's complement of the number of tracks the head is to be moved is entered in step 254 into a counter (not shown) in the microprocessor 64 to be clocked by track crossing signals generated by the demodulator 60. The gain of the summing amplifier 70 with respect to the velocity demand profile is then set high by closing the switch 88 and the switch 72 is opened to place the servo circuit 44 in the seek mode of operation. As shown in block 256, successive D/A values of the velocity demand profile, beginning with the maximum value thereof, are entered into the latch 82 to initiate motion of the head 40 toward the destination track.

As the head 40 moves across the disk 24, the two's complement of the number of tracks to go will be incremented each time the demodulator senses a track crossing and the microprocessor 64 is programmed to periodically check the contents of the counter containing such complement as indicated by the decision block 258. At such time that the number of tracks yet to be moved equals the assumed value of six at which the gain transition is to occur, the switch 88 is opened to decrease the gain of the amplifier 70 with respect to D/A values received thereby, as indicated by the operation block 260, and the prior art velocity demand profile is adjusted, at operation block 262, by adding to each D/A value thereafter entered into the latch 82 the profile adjustment value stored in the bin allocated to the zone which contains the destination track for movement in the first direction. In accordance with the assumptions made for this initial seek, such value will be zero so that the seek will be completed in accordance with the portion 126 of the prior art velocity demand profile. Such completion is signalled, at the decision block 264, when the counter that contains the number of tracks to go is incremented to zero by a pulse from the demodulator 60.

When this last pulse is received by the microprocessor 64, a second counter (not shown) is reset to count pulses of the microprocessor clock, at block 266, and such counting will continue until the on track threshold is reached, as signalled by a "true" output from the track center detector 78. (In the case of an overshoot, the transition to track following mode of operation will occur at this time; in the case of an undershoot, the transition will have occurred at an earlier time as has been discussed above.) When the on track threshold is reached, the time in the counter; that is, the approach time, is utilized by a program instruction to select the delay time prior to declaration of a "command complete" at decision block 268. If the approach time is less than TA1, indicating excessive overshoot, the two's complement of the stored value of TD2, less the time TFR for any subroutines to be carried out prior to issuance of the "command complete" declaration, is entered into a third counter (not shown) of the microprocessor 64 (operation block 270) If the approach time is greater than TA1 but less than TA2, the two's complement of stored value of TD1, less TFR, is entered into the third counter (operation block 272) and if the approach time is greater than TA2, the two's complement of TD3, less TFR is entered into the third counter (operation block 274). Clocking of counter using the microprocessor clock is then initiated and the value to be stored in the profile adjustment bin for movement in the first direction to the zone that contains the destination track is updated, if necessary (operation block 282 to be discussed below with reference to FIG. 13), while the delay time appropriate to the seek is counted down. (The time for updating the value stored in the profile adjustment bin will generally be less than any of the delay times TD1 through TD3 because of the relationship of the delay times to distances traversed by the head 40 across the disk 24. As is known in the art, such movement times are long in comparison to instruction cycle times so that the updating of the adaptive profile adjustment to be stored in the profile adjustment bin will be completed prior to the end of the delay time countdown.) Clocking continues until a count of zero is reached to set a TD flag (decision block 276). The flag serves as a programmed interrupt that causes the microprocessor 64 to jump to the final subroutines indicated in operation block 278. Following the completion of these subroutines, a "command complete" enabling reading or writing by the read/write circuit 42 is declared (operation block 280) and the program ends.

Figure 13:
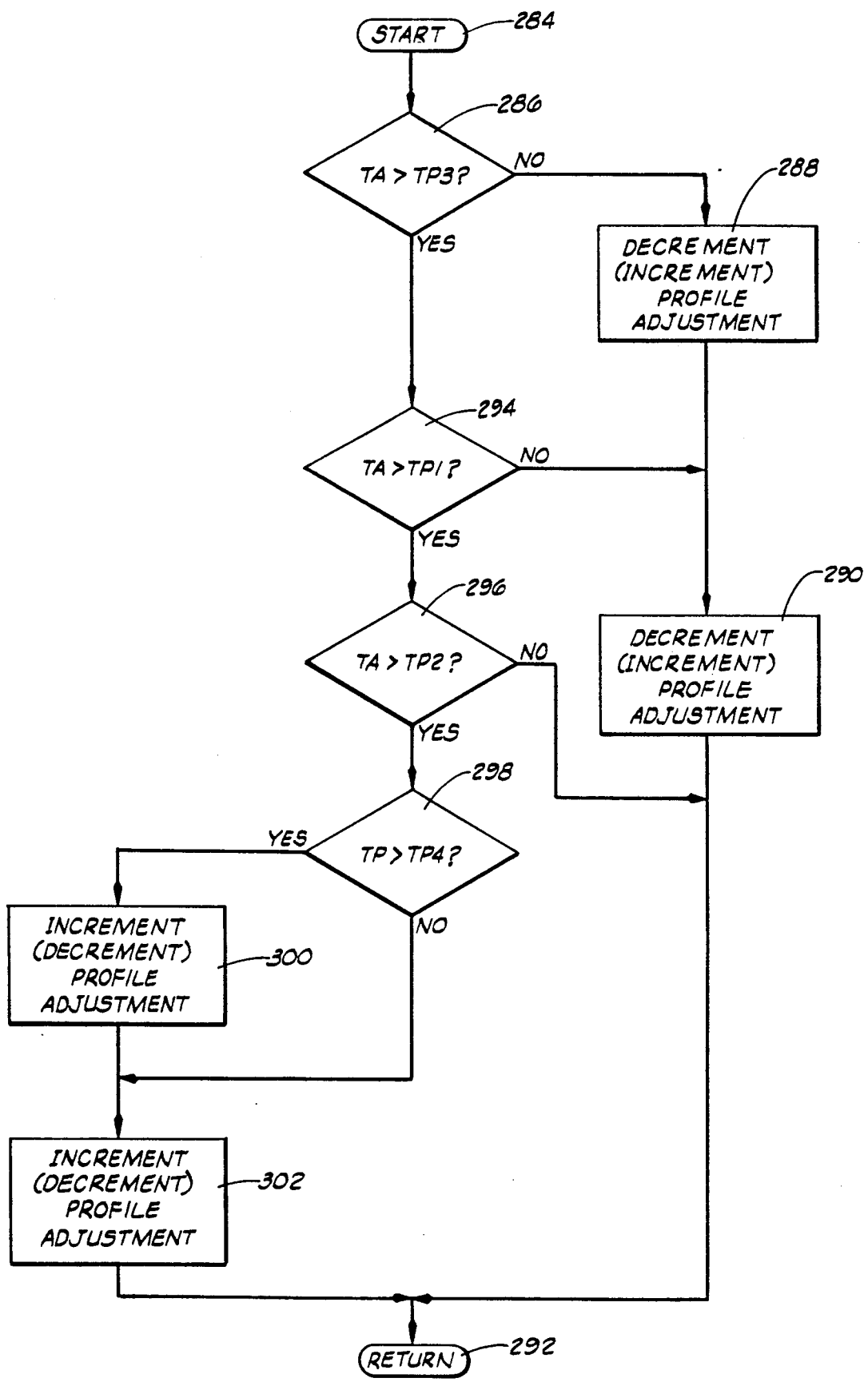
FIG. 13 is a flow chart for updating the velocity demand profile adjustment.

FIG. 13 illustrates the manner in which the updating of the values stored in the profile adjustment bins is carried out. Such updating starts, block 284, after the approach time has been measured at block 26 of FIG. 12 and the appropriate delay time, adjusted for the time to complete final subroutines, has been entered into the third counter referred to above and a countdown to the declaration of a "command complete" has been commenced. If the approach time contained in the second counter at the end of the operation block 266 of FIG. 12 is less than the profile adjustment time TP3, corresponding to very short approach times, that has been stored in a look up table (decision block 286), the adaptive profile adjustment stored in the profile adjustment bin for seeks in the first direction to tracks in the zone containing the destination track will be decremented by one D/A value as indicated at operation block 288. After a second decrement of the adaptive profile adjustment, operation block 290, the microprocessor 64 will return, terminal block 292, to the seek routine shown in FIG. 12.

If the approach time is greater than TP3 (decision block 286), the approach time is compared, decision block 294, to the profile adjustment time TP1. If the approach time is less than TP1, indicating that the speed with which the head 40 entered the fine control region about the destination track was still excessive, although not so excessive as indicated by an approach time less than TP3, the profile adjustment is decremented once, at the operation block 290 and a return is made to the seek routine of FIG. 12.

If the approach time is greater than TP1, so that the head 40 has entered the fine control region about the destination track with a speed corresponding to an ideal seek or with a speed that is too low to result, on average, in an ideal seek, the approach time is compared to the profile adjustment time TP2 at decision block 296. If the approach time is less than TP2, the seek has been substantially ideal and the microprocessor returns to the seek routine of FIG. 12 at terminal block 292.

For seeks having approach times greater than TP2, indicating a less than ideal velocity for the head 40 at the time the head entered the fine control region about the destination track, the approach time is compared to the profile adjustment time TP4 at decision block 298. If the approach time is greater than TP4, indicating a large difference between a velocity that will, on average, yield an ideal seek and the velocity with which the head entered the fine control region about the destination track in the current seek, the adaptive profile adjustment stored in the profile adjustment bin for movement of the head 40 in the first direction to the destination track is incremented twice at operation blocks 300 and 302 and the microprocessor returns to the seek routine of FIG. 12. If not, the adaptive profile adjustment is incremented once, at operation block 302 prior to the return at terminal block 292.

Figure 11:
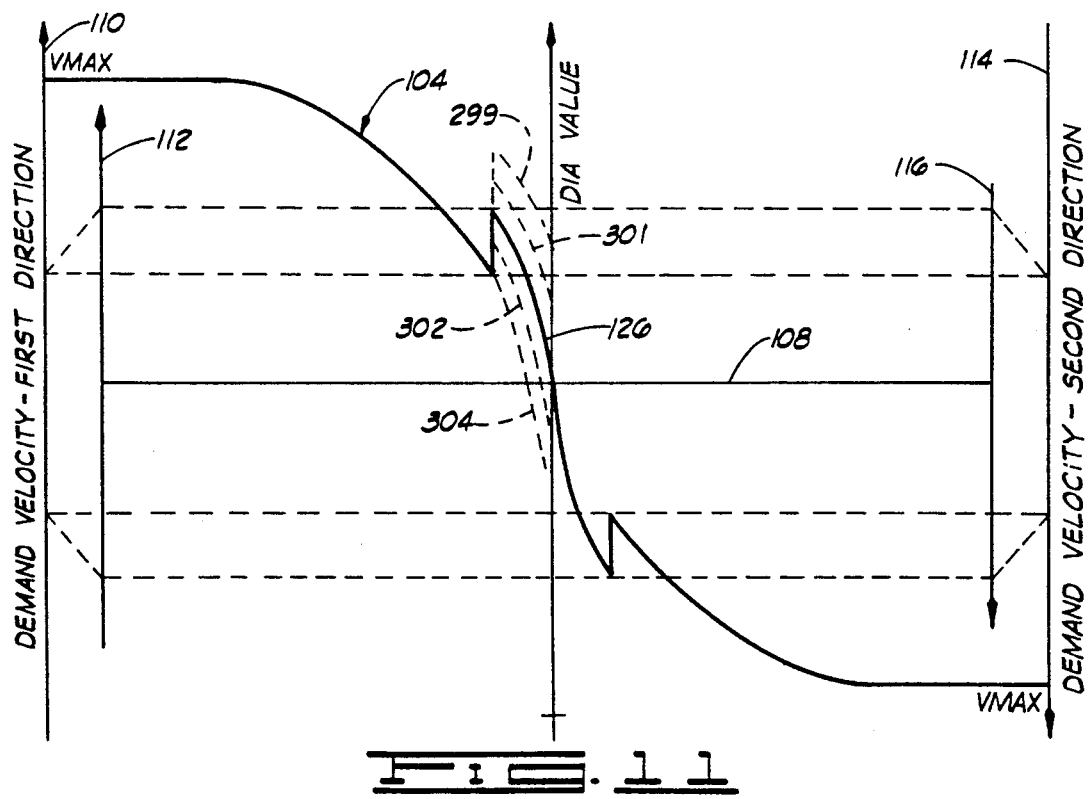
FIG. 11 illustrates the variation of the velocity demand profile in accordance with the present invention.

With the adaptive profile adjustment so selected stored in the bin for the zone containing the destination track for the first direction of movement, the next seek in the first direction to a track in that zone will be modified at the operation block 262 of FIG. 12 to adjust the low gain portion of the velocity demand profile as has been indicated in FIG. 11. In particular, the portion 126 of the prior art velocity demand profile will be replaced with the portion indicated in dashed lines at 299 if the profile adjustment value stored in such bin has been incremented twice, with the portion 301 if such value has been incremented once, with the portion 302 if such value has been decremented once and with the portion 304 is such value has been decremented twice. Accordingly, the next seek in the first direction will be made at a demand velocity which, in any of these cases will tend to cause the seek to more nearly approximate an ideal seek.

For seeks in the second direction, the value stored in the profile adjustment bin for each zone will be described above with the exception that incrementing will take the place of decrementing, and vice versa, for the approach times recited above for the movement in the first direction as indicated in parentheses in FIG. 12 to take into account the decrease in D/A values with increasing demand velocity for movement in the second direction.

Preset of the Profile Adjustment Number Bins

While the method of the present invention can be carried out with the bins which contain the adaptive profile adjustments initially containing the value zero, it is preferred that these values be preset before operation of the device for the storage of data commences to prevent the first few seeks to a track in each zone from being made with a velocity demand profile that will cause a seek that might depart substantially from the ideal. One method for presetting the profile adjustment values that is contemplated within the inventive concept is to program the microprocessor 64 to step the head 40 back and forth across the disk 24 as part of the start up routine for the device 20. By selecting the number of tracks the head 40 moves in each of these steps to be small in relation to the number of tracks included in each zone, the continuously adaptive feature of the profile adjustment will cause the profile adjustment bins to contain adaptive profile adjustments that will result in substantially ideal to each track on the disk 24 once operation of the device 20 to store or retrieve data has commenced.

Systematic Effect Compensation

While the adaptive profile adjustment aspect of the present invention will, with presetting of the profile adjustment bins, enable substantially ideal seeks to be made to any track on the disk 24 once the device 20 is placed in operation, the use of the bins alone for this purpose will be wasteful of RAM for the microprocessor 64 as will now be explained.

As is known in the art, the actuator 50 is subject to bias forces; that is, forces other than the Lorentz force exerted on the coil 54 by passage of a current therethrough, so that a velocity demand profile developed in disregard of these forces will not be appropriate for making seeks. Thus, for example, the heads 38 and 40 are subject to a windage force caused by the circulation of air adjacent the disk and flex forces arising from the connection of electrical leads to the actuator 50. The result is that the head 40 will not follow the velocity demand profile during seeking to a track. This lack of profile following during seeks is one source of the departure of seeks to selected tracks from the ideal. However, the bias forces will, in general, vary systematically across the disk and further, such variation will be substantially the same for all devices of a given type. The significance of this point will become clear below.

In addition to the bias forces, a second systematic effect that will give rise to departures of seeks from the ideal is the presence of offsets in the electronics in which the device 20 is implemented, primarily offsets in the power amplifier 98. Such offsets will again cause the heads 38 and 40 to fail to follow the velocity demand profile during seeks so that the offsets are a second major source of departure of seeks from the ideal. However, the effect of the offsets will generally be constant across the disks 22 and 24 but will vary from device to device.

While the profile adaptation aspect of the present invention is capable of compensating for these systematic effects, the cost is that the profile adjustment bins must have a large capacity to provide a range of profile compensation that will suffice to compensate for offset variations from one device to another and for bias force variations from one zone to another. Thus, if the adaptive profile compensation features of the present invention are used alone, an excessive amount of RAM will be needed to establish the profile adjustment bins to effect the compensation. The present invention contemplates that the systematic effects be compensated using ROM as will now be described.

The device 20 is further comprised of a comparator 312 having one input connected to the output of the proportioning-integrating controller 68 and the other to the servo ground. The output of the comparator 312 is connected to the microcomputer 64. With such connection, the head 40 can be moved to a selected track and the integrated position error signal from the proportioning-integrating controller 68 can be measured by waiting a time sufficient for stable track following to occur and then entering D/A values into the latch 82 to cause the output of the comparator 312 to change state. The D/A value that will cause such a change of state, referred to herein as a device profile compensation adjustment, will be a profile adjustment that will compensate for the combined effect of the bias forces and the offsets for seeks to the selected track. The location of the selected track is stored in ROM for use in seeking as will be discussed below.

At the time of manufacture of the device 20, with the emulator 166 and oscilloscope 168 in place, seeks are made to the selected track and to tracks at the centers of each zone while the portion 126 of the profile 104 is adjusted to obtain, on the average, ideal seeks to each of these tracks. The difference between the adjustments at the zone centers and the adjustment at the selected track are then saved, in a look up table in ROM, as a second profile adjustment to be used during seeks once the device 20 is placed in operation. It will be noted that the values so stored represent the variation in D/A value from the track whose location has been saved to the zone centers that will compensate for the variation in bias force on the actuator from such track to the zone centers. (Since the bias force variation is, as noted above, substantially the same for devices of the same type, the variation in D/A value to effect this compensation need not be determined for all devices 20 of a given type. Rather, it can be determined for a selection of devices and the results can be averaged to obtain a set of D/A values that will substantially compensate for the bias forces for all devices of the type.)

The microprocessor 64 is programmed to move the head 40 to the selected track as part of the start up procedure of the device 20 and, as described above, measure the device profile adjustment and save such adjustment in RAM. Since this adjustment applies to the device as a whole, only one memory address RAM need be used for this purpose. Therafter, each time a seek is made to a selected track, both the device profile adjustment and the second profile adjustment are added to the central portion 126 of the velocity demand profile 104 along with the adaptive profile adjustment stored in RAM. Thus, only non-systematic effects that can cause departures from ideal seeks need be compensated by the adaptive profile adjustments. It has been found that such non-systematic effects can be compensated with the use of profile adjustment bins in RAM having a capacity of only one nibble for each direction of movement of the head 40 movement of the head 40. Presetting of these nibbles is effected by stepping the head 40 across the disk 24 as has been described above.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for minimizing the time for acquisition of a data track on a rotating data storage disk of a hard disk drive by a magnetic head and commencement of data transfer to or from the data track, wherein movement of the head to the data track is effected by a servo circuit that provides control signals to an actuator whereon the head is mounted in relation to the actual radial velocity of the head and demand velocities stored in a velocity demand profile, comprising the steps of:

assigning each data track to one of a plurality of concentric zones on the disk;

storing, for each direction of movement of the head across the disk, an adaptive profile adjustment for each zone on the disk;

adjusting the velocity demand profile for each seek to a selected track in a selected direction by addition of the adaptive profile adjustment stored for the zone to which the selected track is assigned to demand velocities for at least a portion of the velocity demand profile;

measuring an approach time for the head to traverse a preselected distance proximate each data track each time a seek is made to a selected track;

updating the adaptive profile adjustment stored for the zone, for the direction in which the seek is made, to which the selected track is assigned in relation to the measured approach time for the selected track; and commencing reading or writing of data at the end of a delay time selected in relation to the measured approach time.

2. The method of claim 1 wherein the step of commencing reading or writing of data comprises the steps of:

selecting one of first, second and third preselected delay times determined in accordance with criteria selected in relation to settling characteristics for the magnetic head on a data track, wherein the second and third preselected delay times are greater than the first preselected delay time;

selecting the second preselected delay time for commencing reading or writing of data for a measured approach time less than a first preselected approach time;

selecting the third preselected delay time for commencing reading or writing of data for a measured approach time greater than a second preselected approach time greater than the first preselected approach time; and selecting the first preselected delay time for commencing reading of writing of data for all remaining measured approach times.

3. The method of claim 2 further comprising the steps of:

storing a preselected second profile adjustment for each zone on the disk; and further adjusting the velocity demand profile for each seek to a selected track by addition of the second profile adjustment stored for the zone to which the selected track is assigned to demand velocities for said portion of the velocity demand profile.

4. The method of claim 3 further comprising the steps of:

measuring a device profile adjustment at a selected time; and thereafter, further adjusting the velocity demand profile for each seek by addition of the device profile adjustment to demand velocities for said portion of the velocity demand profile.

5. The method of claim 1 further comprising the steps of:

storing a preselected second profile adjustment for each zone on the disk; and further adjusting the velocity demand profile for each seek to a selected track by addition of the second profile adjustment stored for the zone to which the selected track is assigned to demand velocities for said portion of the velocity demand profile.

6. The method of claim 5 further comprising the steps of:

measuring a device profile adjustment at a selected time; and thereafter, further adjusting the velocity demand profile for each seek by addition of the device profile adjustment to demand velocities for said portion of the velocity demand profile.

7. A method for limiting the time for movement of a magnetic head to a data track on a rotating data storage disk of a hard disk drive of the type wherein movement of the head is effected by a servo circuit that provides control signals to an actuator whereon the head is mounted in relation to the actual radial velocity of the head and demand velocities stored in a velocity demand profile, comprising the steps of:

assigning each data track to one of a plurality of concentric zones on the disk;

storing, for each direction of movement of the head across the disk, an adaptive profile adjustment for each zone on the disk;

adjusting the velocity demand profile for each seek to a selected track in a selected direction by addition of the adaptive profile adjustment stored for the zone to which the selected track is assigned to demand velocities for at least a portion of the velocity demand profile;

measuring an approach time for the head to traverse a preselected distance proximate each data track each time a seek is made to a selected track; and updating the adaptive profile adjustment stored for the zone, for the direction in which the seek is made, to which the selected track is assigned in relation to the measured approach time for the selected track.

8. The method of claim 7 further comprising the steps of:

storing a preselected second profile adjustment for each zone on the disk; and further adjusting the velocity demand profile for each seek to a selected track by addition of the second profile adjustment stored for the zone to which the selected track is assigned to demand velocities for said portion of the velocity demand profile.

9. The method of claim 8 further comprising the steps of:

measuring a device profile adjustment at a selected time; and thereafter, further adjusting the velocity demand profile for each seek by addition of the device profile adjustment to demand velocities for said portion of the velocity demand profile.

10. A method for minimizing the time for commencement of reading from or writing to a data track on a rotating data storage disk of a hard disk drive by a magnetic head following movement of the head to a selected track, comprising the steps of:

measuring an approach time for the head to traverse a preselected distance proximate the selected data track as the head approaches the data track; and commencing reading or writing of data at the end of a delay time, measured from completion of the traversal of said preselected distance, selected in relation to the measured approach time.

11. The method of claim 10 wherein the step of commencing reading or writing of data comprises the steps of:

selecting one of first, second and third preselected delay times determined in accordance with criteria selected in relation to settling characteristics for the magnetic head on a data track, wherein the second and third preselected delay times are greater than the first preselected delay time;

selecting the second preselected delay time for commencing reading or writing of data for a measured approach time less than a first preselected approach time;

selecting the third preselected delay time for commencing reading or writing of data for a measured approach time greater than a second preselected approach time greater than the first prselected approach time; and selecting the first preselected delay time for commencing reading of writing of data for all remaining measured approach times.

* * * * *

UNITED STATES PATENT AND TRADEMARK OFFICE
CERTIFICATE OF CORRECTION

PATENT NO. : 5,150,266

DATED : September 22, 1992

INVENTOR(S) : Glenn D. Albert

It is certified that error appears in the above-identified patent and that said Letters Patent is hereby corrected as shown below:

Column 1, line 11, after the word "tracks." delete --2. Brief--;

Column 1, line 12, delete "Description of the Prior Art." substitute therefor --2. Brief Description of the Prior Art--;

Column 12, line 7, delete "and 4" and substitute therefor --and 40--; and

Column 20, line 20, delete "block 26" and substitute therefor --block 266--;

Signed and Sealed this

Fifth Day of October, 1993

Attest:

BRUCE LEHMAN

Attesting Officer

Commissioner of Patents and Trademarks